United States Patent
Kennedy et al.

(10) Patent No.: US 6,601,017 B1
(45) Date of Patent: Jul. 29, 2003

(54) PROCESS AND SYSTEM FOR QUALITY ASSURANCE FOR SOFTWARE

(75) Inventors: Joseph Kennedy, Maple Glen, PA (US); Colleen Esposito, Bensalem, PA (US)

(73) Assignee: GE Financial Assurance Holdings, Inc., Richmond, VA (US)

( * ) Notice: Subject to any disclaimer, the term of this patent is extended or adjusted under 35 U.S.C. 154(b) by 202 days.

(21) Appl. No.: 09/708,715

(22) Filed: Nov. 9, 2000

(51) Int. Cl.[7] .......................... G06F 11/30; G06F 15/00; G01N 37/00
(52) U.S. Cl. ........................ 702/182; 702/82; 702/84; 714/38
(58) Field of Search .............................. 702/35, 81–84, 702/119, 123, 179, 183; 705/9; 714/25, 37, 38, 724; 717/124

(56) References Cited

U.S. PATENT DOCUMENTS

| | | | | |
|---|---|---|---|---|
| 5,798,950 A | * | 8/1998 | Fitzgerald | 703/17 |
| 5,815,654 A | * | 9/1998 | Bieda | 714/38 |
| 5,826,236 A | * | 10/1998 | Narimatsu et al. | 705/8 |
| 5,913,023 A | * | 6/1999 | Szermer | 714/38 |
| 5,949,999 A | * | 9/1999 | Song et al. | 717/127 |
| 6,067,639 A | * | 5/2000 | Rodrigues et al. | 714/38 |
| 6,243,835 B1 | * | 6/2001 | Enokido et al. | 714/38 |
| 6,332,211 B1 | * | 12/2001 | Pavela | 717/130 |
| 2002/0103731 A1 | * | 8/2002 | Barnard et al. | 705/34 |

FOREIGN PATENT DOCUMENTS

JP         06251023 A   *   9/1994   ........... G06F/15/21

OTHER PUBLICATIONS

Moore, B. J. Achieving Software Quality through Requirements Analysis, 1994, IEEE, Proceedings of the IEEE 1994 International Engineering Management Conference, pp. 78–83.*

* cited by examiner

Primary Examiner—Marc S. Hoff
Assistant Examiner—Manuel L. Barbec
(74) Attorney, Agent, or Firm—Hunton & Williams

(57) ABSTRACT

A process and system for quality assurance. The process includes developing a high level quality assurance resource estimate and a high level quality assurance time estimate; producing a business analysis outline; and creating an acceptance test plan using an acceptance test plan template with the business analysis outline. The process further includes creating a plurality of test cases to be carried out during a test execution phase of the quality assurance process using the acceptance test plan; refining the high level quality assurance resource estimate and the high level quality assurance time estimate based on the acceptance test plan; executing each of the test cases in an acceptance test to produce a set of test results for each of the test cases; and evaluating the test results against the refined high level quality assurance resource estimate and the refined high level quality assurance time estimate. One or more defects tracked during the execution of the test cases are reported and a sign off of the acceptance test is negotiated with a client. An application audit package is created and stored for future reference.

36 Claims, 9 Drawing Sheets

FIG. 6

| FUNCTIONS - WA | FUNCTION NUMBER | WA | | EXPECTED RESULTS | PASS/FAIL |
|---|---|---|---|---|---|
| SOURCE CODE = RADIO<br>1 CAR 1 OP DOB 1/1/1930<br>VEH ANNUAL MILEAGE = 3000 | 1 | 840430090 | C | SHOULD NOT BE ASKED PURCHASE ODOMETER & DATE | PASS |
| SOURCE CODE = NEWSPAPER INSERT<br>CAR 1 OP INVALID VIN<br>MARRIED POP-UP = SEPARATED WITH NO CO-REGISTERED VEHICLES<br>COMP/LIABILITY | 2 | 840430138 | C | | PASS |
| SOURCE CODE = OTHER<br>1 CAR 1 OP DOB 1/1/1980<br>GPA = A<br>COMP/COLL/LIAB | 3 | 840430154 | C | SHOULD RECEIVE GOOD STUDENT DISCOUNT | PASS |
| SOURCE CODE = PRINT AD<br>1 CAR 1 OP<br>1 TYPE A INCIDENT<br>LIABILITY ONLY | 4 | 840430171 | C | | PASS |
| SOURCE CODE = RECEIVED MAIL SOLICITATION<br>2 CARS 2 OPS<br>1 VIN 1 NO VIN BOTH VEH = 1999 TOYOTA 4 RUNNER<br>OP 1 HAS 2 AT FAULT ACCIDENTS | 5 | 840430201 | C | | PASS |

CA LOG/SCRIPT 700

| TEST CASE NUMBER | LOG/SCRIPT ACTIVITY | QUOTE NUMBER | EXPECTED RESULTS | COMMENTS |
|---|---|---|---|---|
| 10 | USER ID =     PASSWORD = | Q 840523012 M 840523047 | | PASS. RELATIONSHIP TO APPLICANT ASKED IN CA. WAITING FOR MAPPING INFO FROM Q..ALL OTHER INFORMATION IS CORRECT. |
| | FREE-FORM MIRROR TEST CASE - KEY A TEST CASE INTO THE Q 'TEST SITE, MAKING SCREEN PRINTS OF EVERY SCREEN. THEN KEY THE SAME EXACT INFORMATION INTO M USING THE SCREEN PRINTS AS A REFERENCE. ALSO, FOLLOWING PLUGGING RULES TO PLUG NECESSARY FIELDS IN M | | QUOTE: RATES AND ALL FIELDS ARE IDENTICAL | |
| 11 | USER ID =     PASSWORD = | Q 840525066 M 840525155 | | PASS |
| | FREE-FORM MIRROR TEST CASE - KEY A TEST CASE INTO THE Q TEST SITE, MAKING SCREEN PRINTS OF EVERY SCREEN. THEN KEY THE SAME EXACT INFORMATION INTO M USING THE SCREEN PRINTS AS A REFERENCE. ALSO, FOLLOWING PLUGGING RULES TO PLUG NECESSARY FIELDS IN M | | QUOTE: RATES AND ALL FIELDS ARE IDENTICAL | |
| 12 | USER ID =     PASSWORD = | 840524311 | | PASS |
| | SCORING TEST CASE | | QUOTE - ASSIGNED TO | |
| | 2 OPERATORS/ 2 VEHICLES | | | |
| | OPERATOR 1 AGE = 55 | | | |
| | OPERATOR 2 AGE = 50 | | | |
| | VEHICLE 1 = 1996 TOYOTA CAMRY | | | |
| | VEHICLE 2 = 1990 TOYOTA COROLLA | | | |
| | OPERATOR 1 HAS A 12 MONTH OLD MINOR MOVING VIOLATION | | | |
| | OPERATOR 2 HAS A 12 MONTH OLD MINOR MOVING VIOLATION | | | |
| 13 | USER ID =     PASSWORD = | 840523276 | | PASS |
| | 1 OPERATOR/ 2 VEHICLES | | 1 OPERATOR/ 2 VEHICLES | |
| | OPERATOR 1 MARITAL STATUS = SINGLE | | SINGLE | |
| | OPERATOR 1 OCCUPATION = ENTERTAINMENT | | ENTERTAINER | |

701 — TEST CASE NUMBER
702 — LOG/SCRIPT ACTIVITY
703 — QUOTE NUMBER
704 — EXPECTED RESULTS
705 — COMMENTS
706 — (bracket grouping test case 10)

FIG. 7

PROCESS AND SYSTEM FOR QUALITY ASSURANCE FOR SOFTWARE

BACKGROUND OF THE INVENTION

The present invention relates to quality assurance processes used in software development, and more particularly, to acceptance testing processes used in software development.

Acceptance testing is a quality assurance process that is used in the software industry for a newly developed software application. It is a process of verifying that the newly developed software application performs in accordance with design specifications for such newly developed software. The goals of acceptance testing are to achieve zero defects in the newly developed software application and on-time delivery of such newly-developed software application. Acceptance testing may be performed for an internally developed software application as well as for an externally developed software application. Acceptance testing may be performed for a software application intended for use internally within a business entity as well as for a software application developed for a client. Acceptance testing may be performed by a software developer, a user of the software or a third party.

However, acceptance testing is often performed in an ad hoc manner. Steps in an acceptance testing process may be repeated or inefficiently performed. Thus, acceptance testing may require a greater amount of time than is ideal and may not effectively eliminate defects in the newly developed software.

BRIEF SUMMARY OF THE INVENTION

A process and system for quality assurance for a newly developed software application is described. The process includes developing a high level quality assurance resource estimate and a high level quality assurance time estimate; producing a business analysis outline; and creating an acceptance test plan using an acceptance test plan template with the business analysis outline. The process further includes creating a plurality of test cases to be carried out during a test execution phase (i.e., during an acceptance test) of the quality assurance process using the acceptance test plan; refining the high level quality assurance resource estimate and the high level quality assurance time estimate based on at least the acceptance test plan; executing each of the test cases in an acceptance test to produce a set of test results for each of the test cases; and evaluating each of the sets of test results against the refined high level quality assurance resource estimate and the refined high level quality assurance time estimate. One or more defects tracked during the execution of each of the test cases are reported and corrected and a sign off of the acceptance test is negotiated with a client. An application audit package is created and stored for future reference.

BRIEF DESCRIPTION OF THE DRAWINGS

FIG. 6 is an example screen shot of one embodiment of a function log document;

FIG. 7 is an example screen shot of one embodiment of a test script document;

DETAILED DESCRIPTION OF THE INVENTION

The present invention is described in relation to a process and system for acceptance testing of software. Nonetheless, the characteristics and parameters pertaining to the process and system of the invention may be applicable to acceptance testing of other types of products and services. The process and system, and the sub-processes and subsystems, of the invention may be used for updates to existing software applications as well as for newly developed software applications.

Acceptance testing is a third tier of software functionality verification. Acceptance testing occurs after a first tier of unit testing and a second tier of system testing with respect to a particular software product or application have been completed. Acceptance testing involves testing the entire software application's functionality as it is to be used in a production environment by a user.

Figure 1:
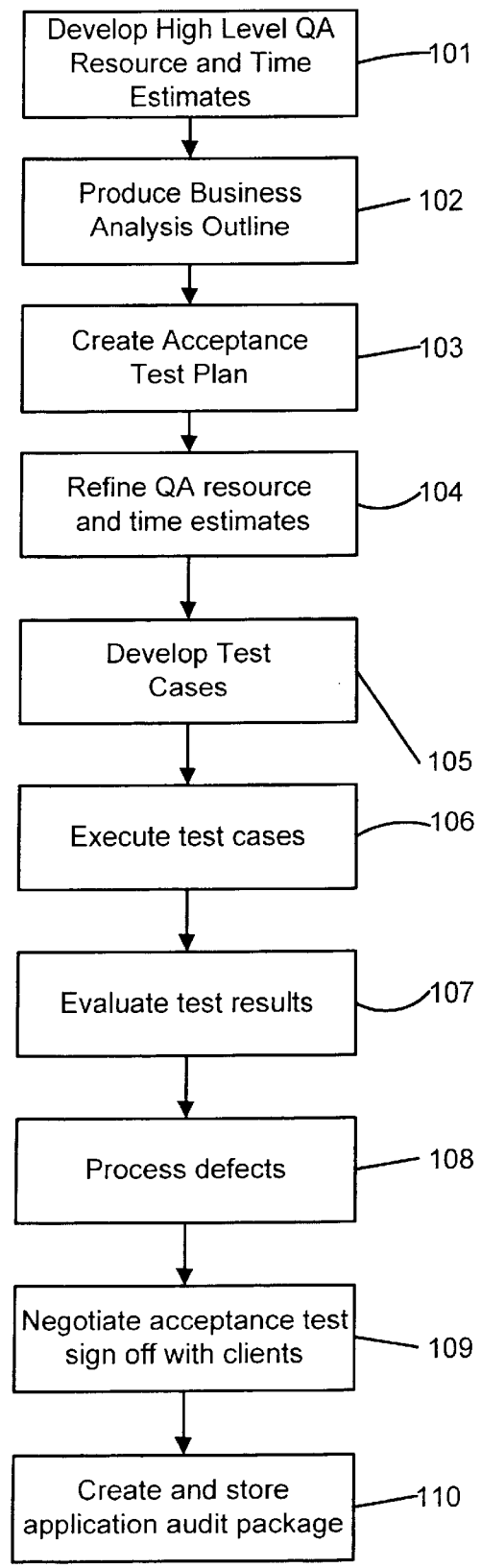
FIG. 1 is a flow chart illustrating one embodiment of a process of conducting an acceptance test.

FIG. 1 is a flowchart illustrating one embodiment of a process of conducting an acceptance test. At step 101, a high level quality assurance resource estimate and a high level quality assurance time estimate are developed. At step 102, a business analysis outline is produced. At step 103, an acceptance test plan is created using an acceptance test plan template with the business analysis outline produced at step 102. At step 104, the high level quality assurance resource estimate and the high level quality assurance time estimate are refined. At step 105, a plurality of test cases to be carried out during a test execution phase of an acceptance test are developed. At step 106, each of the test cases are executed in the acceptance test to produce a set of test results for each of the test cases. At step 107, each of the sets of results of the test cases is evaluated against predicted results outlined in an acceptance test function log or test scripts, described below with reference to step 312 of FIG. 3. At step 108, one or more defects tracked during the execution of each of the test cases are processed. At step 109, a sign-off of the acceptance test is negotiated with a client. At step 110, an application audit package is created and stored for future reference.

As will be described in more detail below, the various processes illustrated in FIG. 1 may be performed by a system, such as the system illustrated in FIGS. 8 and 9. Additionally, the sequence of steps shown in FIG. 1 may be modified in accordance with the present invention. The steps illustrated in FIG. 1 will now be described in greater detail.

At step 101, a high level quality assurance resource estimate and a high level quality assurance time estimate is developed. Each of these estimates may be based on a past quality assurance experience, a number of test cases and/or a level of staffing. The high level quality assurance resource estimate and the high level quality assurance time estimate may each be developed in a staff allocation process, as described below.

The high level quality assurance resource estimate and the high level quality assurance time estimate are each developed very early in a project life cycle of a software development project. Thus, the acceptance testing process is also started early in the life cycle of the software development project. Early initiation of the acceptance testing process allows earlier detection and correction of any defects, and a lowering of a cost of correction of any defects.

At step 102, a business analysis outline is produced. The business analysis outline is an input document to the acceptance testing process. The business analysis outline may be prepared by a lead quality assurance analyst. The business analysis outline may include, for example, an interpretation of a plurality of user requirements for a software application to be developed in the software development project. The business analysis outline, may also include a plurality of queries for making a determination of whether the user requirements have been met. The step 102 of producing the business analysis outline also provides an opportunity to reevaluate and confirm that the prior high level quality assurance resource estimate and the high level quality assurance time estimate are correct.

At step 103, an acceptance test plan for testing the software application is created. The acceptance test plan may be created by the lead quality assurance analyst using an acceptance test plan template along with the business analysis outline developed at step 102. The acceptance test plan is a document describing a plurality of steps to be conducted during execution of the acceptance test, a plurality of factors that need to be considered in executing the acceptance test, and any other elements associated with the execution of the acceptance test. The acceptance test plan creation process will be described in more detail below with reference to FIG. 3.

At step 104, the prior high level quality assurance resource estimate and the high level quality assurance time estimate are refined. The high level quality assurance resource estimate and the high level quality assurance time estimate may be refined based on the acceptance test plan created at step 103.

At step 105, a plurality of test cases or "function logs" are developed using the acceptance test plan created in step 103. The test cases or function logs are comprised of a plurality of detailed descriptions of tests that are to be carried out during the execution of the acceptance test plan. The development of the test cases will be described in more detail below with reference to FIG. 4.

At step 106, each of the test cases developed in step 105 are executed in the acceptance test. At step 107, a set of test results from each of the executed test cases is evaluated. Each of the sets of test results is evaluated against a set of predefined expected results. Each of the test cases is then labeled by a tester to indicate a "pass" or a "fail". Each of the test cases that fails may indicate a defect in the software application.

At step 108, each of the defects reported during the execution step 106 and the evaluation step 107 of the acceptance test are reported. At step 108, as a defect is encountered, the defect is identified, logged and submitted to the team of software developers for correction. The team of software developers may correct each of the identified defects or explain why the identified corrected defect is not a defect. Once corrected, each of the identified corrected defects is retested, and if appropriate, closed.

At step 109, a sign-off of the acceptance test is negotiated with a client. The lead quality assurance analyst may initiate a discussion with the client to review test results. At this time, any outstanding issues (open defects, system or training issues) may be negotiated. For example, the effect of defects on time frames may be discussed with the client. In some cases, open defects have too great an impact on system functionality and, thus, implementation may need to be moved forward until the defect is fixed. In other cases, open defects are minor enough that implementation is undisturbed and the application is moved into production with the known defects.

At step 110, an application audit package is created and stored for future reference. The application audit package may include completed function logs, a project defect log, a sample of a few defect tickets and resolutions, a representative sample of products produced and a business area sign-off form. The application audit package may also include, where applicable, an acceptance test plan, a final business analysis, and a service request.

The acceptance test process of the present invention provides a repeatable process that effectively directs a verification of a software development process and efficiently eliminates any defects found. The acceptance testing process communicates a plurality of roles and responsibilities for each person involved in the acceptance testing process and a methodology required to successfully validate functionality of a newly developed software application. The acceptance testing process facilitates communication between a client, a team of developers, a tester and an end user, thereby removing any deviations between the software application as specified by the client and the software application delivered to the client by the team of developers.

The acceptance testing process of the invention also eliminates redundant steps involved in prior acceptance testing processes and is, therefore, more efficient. The acceptance testing process is easy to execute and impart to others, including less-experienced, non-technical employees who may need to be trained in conducting the acceptance testing process. The acceptance testing process also facilitates meeting one or more milestones in a software development project.

Figure 2:
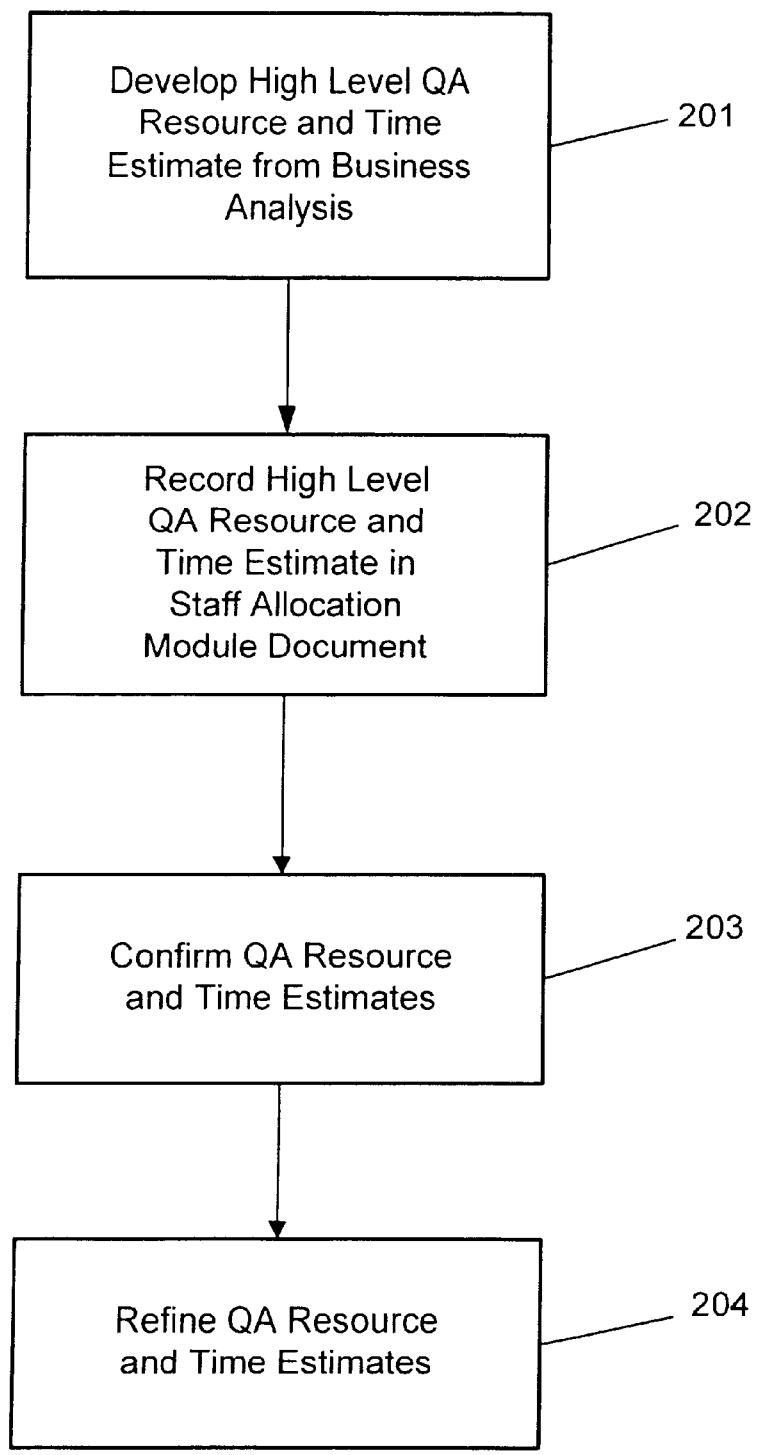
FIG. 2 is a flow chart illustrating one embodiment of a process of conducting a staff allocation.

FIG. 2 is a flowchart illustrating one embodiment of a process for conducting a staff allocation. The staff allocation process involves three (3) stages of making quality assurance resource estimates and quality assurance time estimates. At step 201, a high level quality assurance resource estimate and a high level quality assurance time estimate are developed. At step 202, the high level quality assurance resource estimate and the high level quality assurance time estimate are recorded in a staff allocation document. At step 203, the high level quality assurance resource estimate and high level quality assurance time estimate are both confirmed. At step 204, the high level quality assurance resource estimate and the high level quality assurance time estimate are both refined.

At step 201, the high level quality assurance resource estimate and the high level quality assurance time estimate are developed from the business analysis outline. The high level quality assurance resource estimate and the high level quality assurance time estimate developed in step 201 are the same as the high level quality assurance resource estimate and the high level quality assurance time estimate developed in step 101 of FIG. 1.

Three (3) processes are used in making the estimates. The first process is a "similar project approach." In the similar project approach, a high level quality assurance time estimate and a high level quality assurance resource estimate are derived from a quality assurance resource estimate and a quality assurance time estimate from a similarly complex and similarly sized prior development project. The second process is a "building block approach." In the building block approach, a number of test cases are estimated and that number of test cases is multiplied by a time estimated to execute the test cases. The third process is a "resource leveling approach." In the resource leveling approach, resources are added to those that were used in a prior development project to reduce an implementation time that was required for implementing the prior development project.

At step 202, the high level quality assurance resource estimate and the high level quality assurance time estimate are recorded in the staff allocation document. At step 203, the high level quality assurance resource estimate and the high level quality assurance time estimate in the staff allocation document developed in step 202 are confirmed. The high level quality assurance resource estimate and the high level quality assurance time estimate are confirmed during the review of the business analysis outline process described above with reference to step 102 in FIG. 1.

At step 204, the high level quality assurance resource estimate and the high level quality assurance time estimate are refined. The high level quality assurance resource estimate and the high level quality assurance time estimate are refined in step 204 based on an acceptance test plan, such as the acceptance test plan created in step 103 of FIG. 1 above. The processes described with reference to FIG. 2 may be performed by a system, such as the system described below with reference to FIGS. 8 and 9.

A plurality of inputs to the staff allocation process may include a past quality assurance project data, the business analysis outline and the acceptance test plan. The output of the staff allocation process includes the high level quality assurance time estimate and the high level quality assurance resource estimate, and a staff allocation document which may be provided to members of interested or associated groups including, for example, information technology group. Each successive stage of the quality assurance staff allocation process requires more accurate time and resource predictions.

Figure 3:
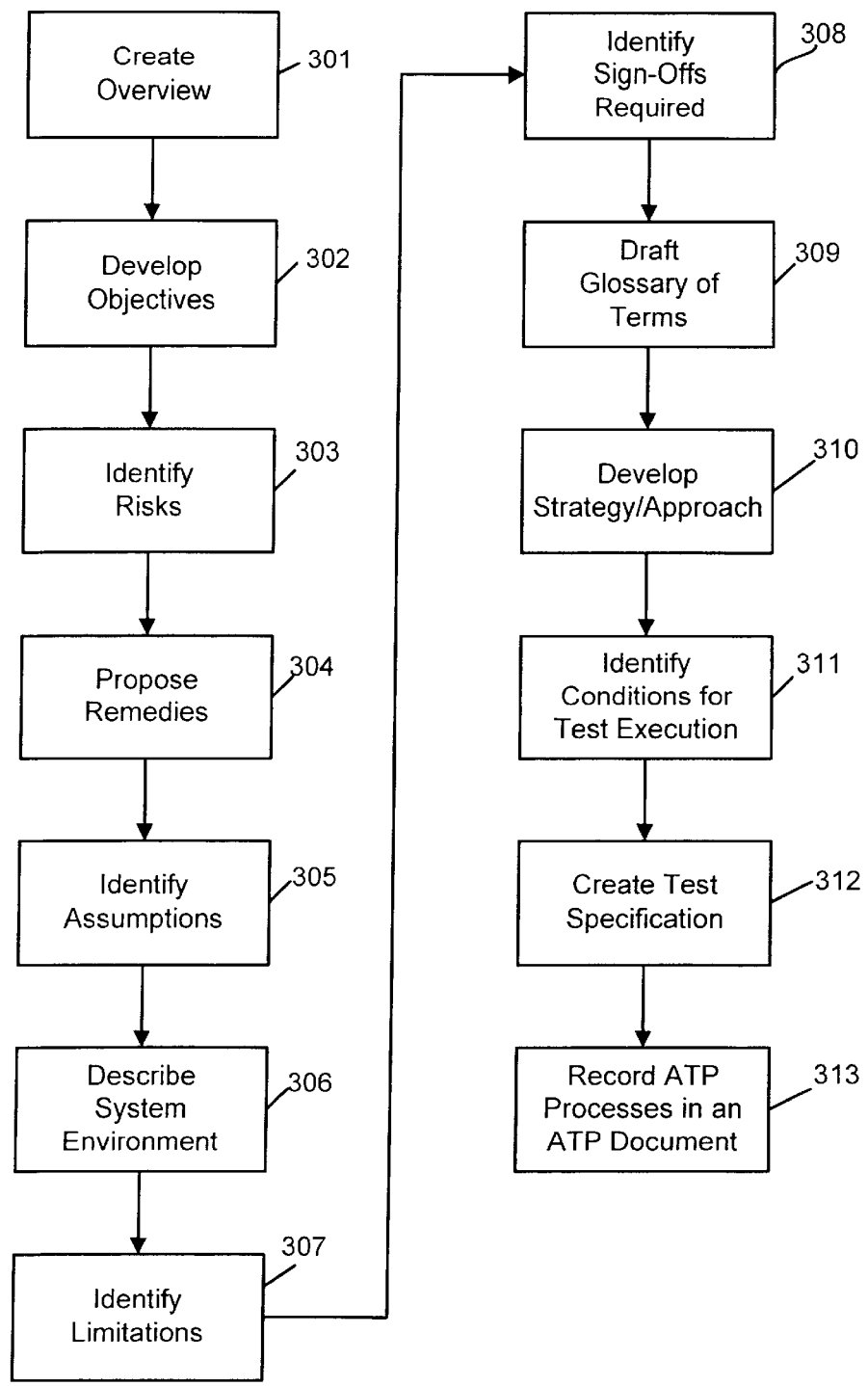
FIG. 3 is a flow chart illustrating one embodiment of a process of developing an acceptance test plan.

FIG. 3 is a flowchart illustrating one embodiment of a process of developing an acceptance test plan. At step 301, an overview is created for the acceptance test plan process. At step 302, a plurality of objectives for completing the acceptance test plan are developed. At step 303, a plurality of risks associated with the acceptance testing are identified. At step 304, a plurality of remedies for the identified risks are proposed. At step 305, a plurality of assumptions for a successful acceptance testing process are identified. At step 306, a required system environment for conducting the acceptance testing is identified. At step 307, a plurality of limitations imposed upon the acceptance test are identified. At step 308, a plurality of sign-offs required for approving the acceptance test plan are identified. At step 309, a glossary of terms used in the acceptance test plan is drafted. At step 310, a strategy and an approach for the acceptance test are developed. At step 311, a plurality of conditions for execution of the acceptance test plan are identified. At step 312, a test specification is created. At step 313, the results of the acceptance test plan process are recorded in an acceptance test plan document. The process illustrated in FIG. 3 may be performed by a system, such as the system illustrated in FIGS. 8 and 9.

Describing the process illustrated in FIG. 3 in more detail, at step 301, an overview of the software application being developed is created. The overview comprises a brief description of the software application being developed. For example, if the software application being developed is for a web-site, the overview may include a description of the web-site and a plurality of objectives of the software application.

At step 302, a plurality of objectives for the acceptance test plan are developed. The objectives may comprise a plurality of high-level goals and a plurality of strategies required to successfully complete the acceptance test. The objectives may comprise ensuring that a functionality for the software application being developed as outlined in the acceptance test plan has been successfully tested, verifying that the objectives of the software application being tested have been successfully met and verifying that the software application being tested can coexist with all required functionality. Additionally, the objectives may include verifying through regression testing that other installed or related software applications continue to properly function, detailing a plurality of activities required to prepare and conduct acceptance testing, defining a methodology that will be used to test and verify system functionality and using acceptance testing as an effective communication tool in identifying and resolving a plurality of system issues and problems. The objectives may further include determining and coordinating a plurality of responsibilities for persons involved in the acceptance testing, defining a plurality of environments and test cycle approaches required to effectively complete the acceptance testing and defining all system functions to be tested, as well as those functions that will not be tested.

At step 303, a plurality of risks to the acceptance testing process are identified. The risks may include risks to a schedule and/or risks to a quality level. The risks identified may include a tight schedule where any additional functionality or requirement changes could result in a delay in implementation of the software application and a need for dedicated technical support in order to eliminate any testing down time.

At step 304, a plurality of remedies or contingencies are proposed for the identified risks. Each identified risk must have a corresponding remedy or contingency. For example, if a risk to an acceptance test schedule is that the schedule is very tight and any additional functionality or requirement changes could result in a delay in implementation of the software application, a corresponding contingency may be that any requirement changes after a certain date must follow one or more procedures, such as a predetermined change control procedure.

At step 305, a plurality of assumptions are identified for the acceptance testing. The assumptions may include a plurality of basic testing related issues that are required for a successful acceptance testing process. For example, the assumptions may include an assumption that, at the end of a design phase, a detailed schedule of the software deliverables will be published, all functionality required to fully support an application must be ready for acceptance testing on or before a certain date, and all documentation relating to the software application will be made available to a quality assurance group on or before a certain date.

At step 306, a system environment for acceptance testing is described. The description of the system environment may include a description of a hardware and a software interface needed for acceptance testing. The description may also include a type of hardware and software platform, such as, for example, a specific mainframe system and related software interfaces for a Marketing Sales System such as, for example, Choicepoint™, Correspondence™, EPS™ Electronic Publishing, Code 1™, POLK™, Ratabase 1.5™, or other similar systems.

At step 307, one or more limitations or constraints to the acceptance test plan are identified. The limitations may include, for example, that the scheduled implementation date for a new software application is firm and cannot be changed.

At step 308, a plurality of sign-offs required for approving the acceptance test plan are identified. The sign-offs required may include a list of persons from a client area who will be responsible for approving the acceptance test plan and reviewing any test material and a list of persons from the information technology group who will approve the acceptance test plan from a technical point of view.

At step 309, a glossary of terms used in the acceptance test plan is drafted. The glossary of terms may include a definition of each technical, business, and quality assurance term that may be unfamiliar to those reviewing the acceptance test plan. The glossary of terms may include, for example, a name of the software application being tested, a vendor name, and other terms and acronyms that may be unfamiliar to a person reviewing the acceptance test plan.

At step 310, a strategy is developed for the acceptance testing. The strategy or approach for the acceptance testing includes identifying a test environment for the execution of the acceptance test plan and developing a scope and an approach for the execution of the acceptance test plan.

Identifying the test environment comprises providing a high level description of resources, both hardware and software, that will be required in order to conduct the acceptance testing. For example, the description of the test environment may include a requirement for a facility to be available at a certain time, including evening and weekend availability, an identification of all interfaces that must be available to verify the test cases, and an identification of all functionality of the software being tested that must be ready for acceptance testing on a certain date for the start of acceptance testing.

The scope and approach for the acceptance testing comprises an identification of one or more functions or tests that are planned for the acceptance testing and any testing limitations or identifiable ranges of the tests. The scope and approach may include, for example, a number of stages of a test with an identification of a type of test. For example, the test may include two stages with the first stage comprising a timing test, if a goal of the software application under development is to reduce processing time, and a second stage comprising a system functionality test. The scope and approach of the acceptance testing may then be further described by listing an approach, such as, for example, "a timing test goal", "a timing test measurement", "a timing test specific form" and "one or more timing test participants and locations" under the timing test state, and "one or more screen flows/links", "a pre-fill validation", and "one or more default field values", under the system functionality test stage.

At step 311, one or more conditions required for execution of the acceptance test plan are identified. The conditions may include an entrance criteria condition, a resources required condition, an acceptance test tools condition, and an organization for testing condition.

The entrance criteria are one or more events required by the quality assurance group to be successfully completed prior to the beginning of the acceptance testing. For example, the entrance criteria may include that a volunteer tester must have an ability to access the acceptance testing site from his home, that an identification of all problems detected during system testing must be forwarded to the quality assurance group prior to the start of acceptance testing, a verification that the acceptance testing environment is ready to support acceptance testing, that a test team has been identified and trained, that all system documentation has been turned over to the quality assurance group, that an acceptance testing schedule has been agreed upon and published and that all major interfaces of the software application to be tested are available for acceptance testing.

The resources required comprise an identification of the human, hardware and software resources required to complete the acceptance testing. For example, the identification of the human resources required may include a listing of persons required to conduct the acceptance testing such as a number of quality assurance analysts required, and a number of volunteer testers working from home or at the acceptance testing facility. The identification of the hardware/software resources required may include an identification of a type of platform such as a mainframe system, or Internet access.

The acceptance test tools include any software package that automates any part of the acceptance testing process. For example, the acceptance test tools may include Microsoft Word® or other word processing program, a copy tool for the software application being tested or a session open tool.

The identification of the organization for acceptance testing comprises identification of persons required to conduct the acceptance testing and their corresponding responsibilities during the acceptance testing. For example, the responsibilities may include a responsibility for "Review of Acceptance Test Plan", a responsibility for "Keying Test Cases", and a responsibility for "Reviewing Test Results". Then, the human resources required to fulfill such responsibilities may be listed under each responsibility, such as, for example, in the "Review of Acceptance Test Plan" category, the human resources required may include a Project Manager, an Applications Team Leader, a Business Analyst, a Quality Assurance and a Business Partner.

At step 312, a test specification is created for the acceptance test plan. The test specification may include a test structure/organization section, a test functions or cases section, a test scripts or function logs section, and a test schedules and test completion criteria section. The test structure/organization section may be comprised of one or two paragraphs relating to one or more types of processing cycles and environment changes that may be needed during the acceptance testing.

The test functions or cases section makes up the primary section of the acceptance test plan. The test functions/cases section identifies all of the functions or cases to be verified during the acceptance testing. The test scripts/function logs section should be included in the test specification so that the function logs and test scripts are generally available upon request. A test schedule identifies a schedule established in the scope and approach section of the acceptance test plan.

The test completion criteria include a paragraph that describes a framework for handling any severe system problems that remain open at the end of acceptance testing. For example, the test completion criteria may state that all major functions and sub-functions of the software application being tested will be considered to have passed acceptance testing when no severe system problem remains open. The test completion criteria may then describe how to identify a severe system problem.

At step 313, the acceptance test plan processes are recorded in an acceptance test plan document. Thus, all of the processes described from step 301 to step 312 will be recorded in a document to be approved by the persons identified at step 308.

Figure 4:
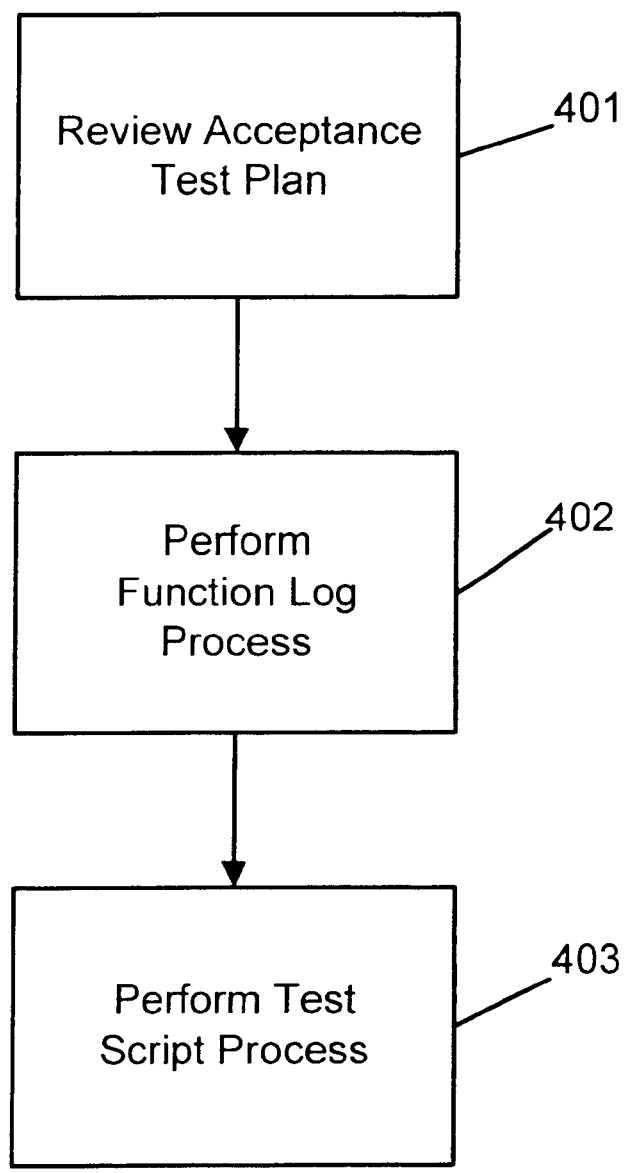
FIG. 4 is a flow chart illustrating one embodiment of a process of creating a plurality of test scripts for an acceptance test.

FIG. 4 is a flowchart illustrating one embodiment of a process of creating a plurality of test scripts for an acceptance test plan. At step 401, an acceptance test plan is reviewed. Specifically, the test functions/cases section of the test specification created at step 312 of FIG. 3 is reviewed.

At step 402, a function log process is performed. In the function log process, the functions/cases section of the acceptance test plan is referenced in order to create one or more function logs. A function log may contain many individual test cases or scenarios. A function log may include a plurality of headings including, a function heading, a function number heading, an identifier heading, an expected results heading and a pass/fail heading. An example of a function log is described with reference to FIG. 6 below. An input to the function log process is the test function/cases section of the acceptance test plan. An output of the function log process is a physical document called a function log.

At step 403, a test script is created using the function log. A test script may contain more specific testing instructions than a function log. The test script may include a plurality of headings including a function/script heading, a function/script number heading, a script activity per cycle heading, an expected results heading and a pass/fail per cycle heading. Either the function logs or the test scripts may be used as guides for executing the acceptance test plan, depending upon the skill level of the tester. If the skill level of the tester is high or if the tester has a lot of experience in conducting acceptance testing, the function logs may be used by the tester. However, if the test scripts are used, a tester having a lower skill level may execute the acceptance test. The input to the test script process is the function log document and the output to the test script process is the test script document. The test case descriptions from the acceptance test plan, the function logs or the test scripts may be used as instructions for carrying out test cases, where the test scripts comprise more detailed instructions than the function logs, and the function logs comprise more detailed instructions than the test case descriptions.

Figure 5:
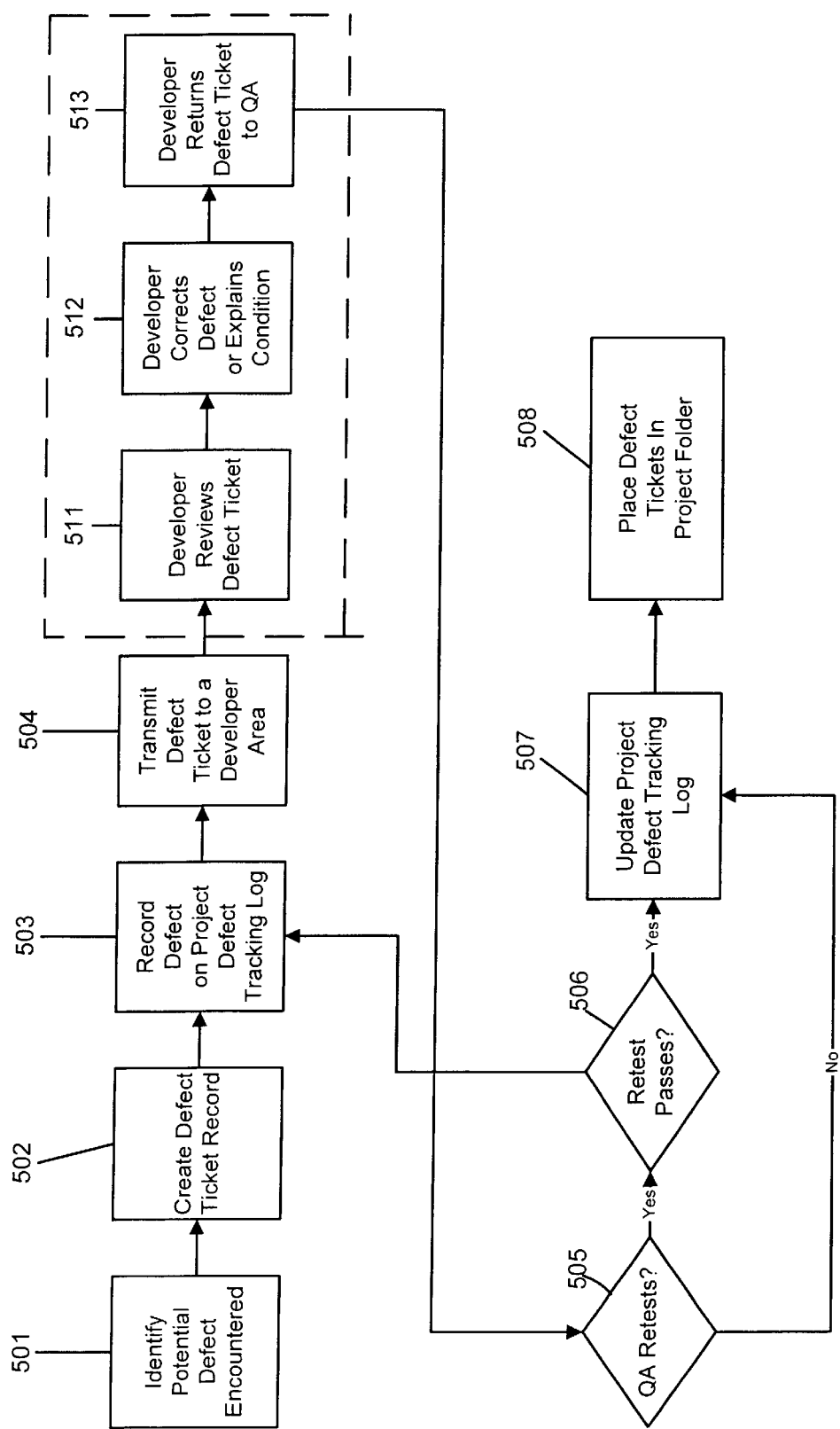
FIG. 5 is a flow chart illustrating one embodiment of a process for processing defects in an acceptance test.

FIG. 5 is a flowchart illustrating one embodiment of a process of processing defects in an acceptance test plan. At step 501, a potential defect is identified during the acceptance testing. At step 502, a defect ticket record is created for the identified potential defect. At step 503, the defect is recorded on a project defect tracking log. At step 504, the defect ticket record is transmitted to a developer area 510. Steps 511–513 occur in developer area 510. At step 511, a developer reviews the defect ticket record. At step 512, the developer corrects the defect or explains why the identified problem is not a defect. The developer then updates the defect ticket record to reflect a date of correction of the defect and an identity of a corrector of the defect if the defect was corrected. If the identified defect was not corrected, the developer updates the defect ticket record with an explanation for why the defect was not corrected. At step 513, the developer returns the defect ticket record to a quality assurance area. At step 505, a quality assurance analyst in the quality assurance area checks to see if the defect needs to be retested. If the defect was corrected in the developer area 510, then the corrected defect will require retesting. If the defect was retested, then, at step 506, the quality assurance analyst checks to see if the corrected defect passed the retesting. If the corrected defect did not pass the retesting, the process returns to step 503 where the updated defect information is recorded on the project defect tracking log and transmitted at step 504 to the developer area 510. If the corrected defect passes the retesting, the project defect tracking log is updated at step 507 and the defect ticket record is also updated to reflect that the corrected defect passed the retesting and that the defect ticket record is closed. If the defect does not need to be retested, the project defect tracking log is updated at step 507. At step 508, the defect ticket records are placed in a project folder.

The defect ticket record of step 502 may include an identification of the project, a defect number, a priority level identification, an identification of a person reporting the defect, a test case number, a function area identification, a description of the defect, a date of opening of the defect ticket, an identification of the software application subject to the defect, an identification of a corrector and a date of correction of the defect, an identification of a retester and a date of retesting, and a date of closing of the defect ticket record if the corrected defect passes the retesting.

FIG. 6 is an example of a screen shot of one embodiment of a function log document 600 illustrating an acceptance test plan for an automotive insurance software application developed for an automotive insurance provider entity. It should be understood, however, that the function log document of the invention can be modified as required for use by any type of business entity for acceptance testing of any type of software application.

Function log document 600 includes a plurality of fields including a Function field 601, a Function Number field 602, an Identification Number field 603, an Expected Results field 604 and a Pass/Fail field 605. During an acceptance test, a plurality of test cases 606–610 are performed. With reference to a test case 606, the test case 606 is for a user who learned of the insurance provider through a radio commercial, who has one car with one operator where the user has a date of birth in 1930 and the car has an annual mileage of 3,000 miles per year, as listed in Function field 601 of test case 606. A function number assigned this test case 606 is 1, as listed under the Function Number field 602. The test case 606 is assigned an identification number of 840430090 as listed in the Identification Number field 603. The expected results of the entered information for the test case 606 is that the user should not be asked for the odometer purchase date or date of purchase, as listed under the Expected Results field 604. An indication is listed in the Pass/Fail field 605 of whether the test case 606 passed or failed the testing. As shown in FIG. 6, the test case 606 passed the testing.

FIG. 7 is an example of a screen shot of one embodiment of a test script document 700. As shown in FIG. 7, the test script document 700 is a test script used for acceptance testing of the automotive insurance software application for insurance requirements in the State of California. The test script document 700 includes a plurality of fields including a Test Case Number field 701, a Log/Script Activity field 702, a User Number field 703, an Expected Results field 704 and a Comments field 705.

The Test Case Number field 701 lists the number of the test case. The log/script activity field 702 lists a user ID and a password to be entered by a tester and detailed instructions on how to perform the test case. As an illustrative example, a test case 706 is input for a situation where a user lives in California compared to where the user lives in a state other than California. The expected results, as listed in the Expected Results field 704, are that a quote for a cost of an automotive insurance product should be the same for the user regardless of whether the user's information was entered into system "Q" or "M". As shown in the Comments field 705, the software application subject to testing passed the testing. The Comments field 705 may also be used by a tester to enter any comments or notes that indicate some activity needs to be performed or investigated.

Figure 8:
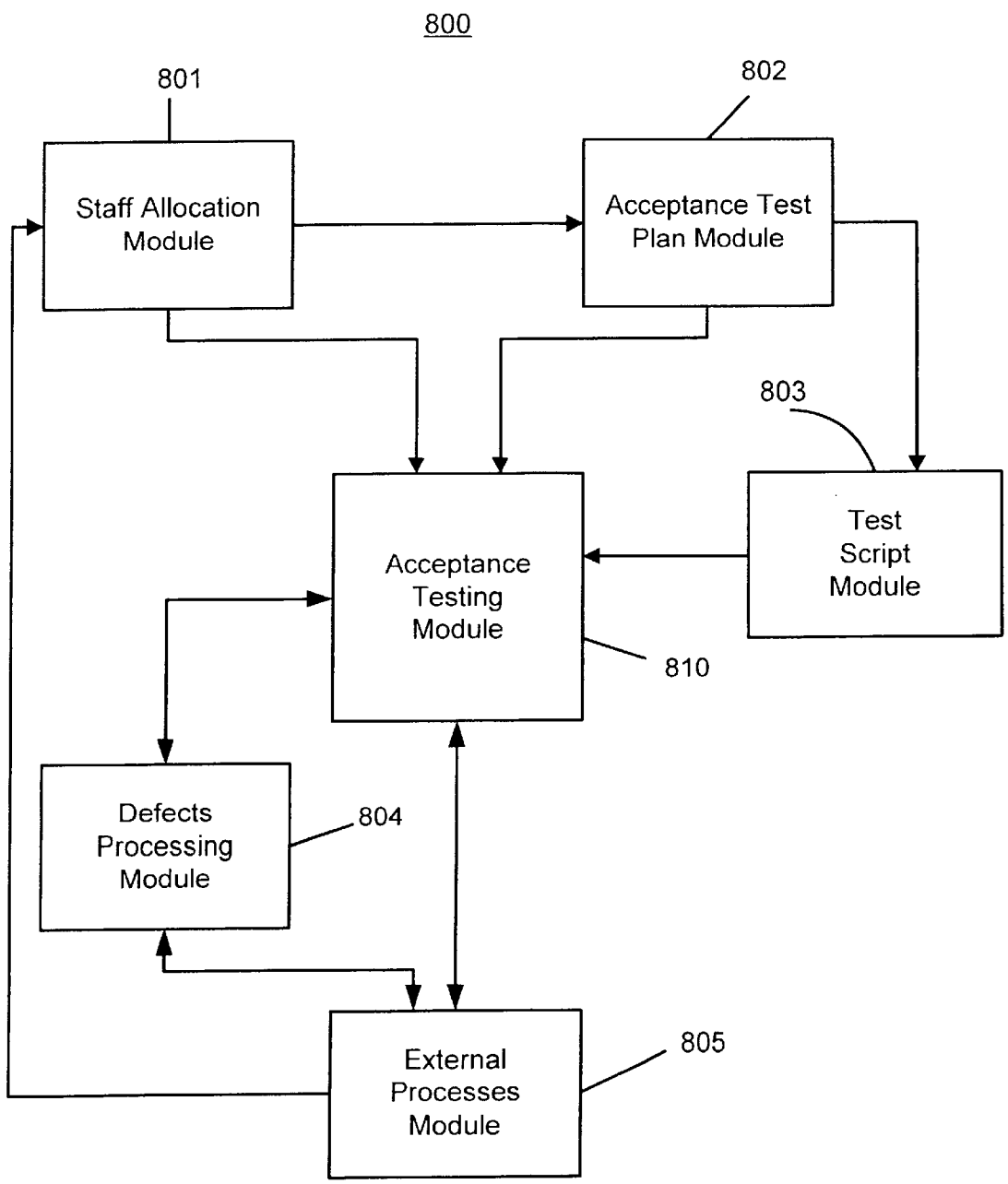
FIG. 8 is a block diagram of one embodiment of a system for acceptance testing.

FIG. 8 is a block diagram of a system 800 used for acceptance testing. System 800 includes a staff allocation module 801, an acceptance test plan module 802, a test script module 803, a defects processing module 804, an external processes module 805 and an acceptance testing module 810. The acceptance testing module 810 receives inputs from the staff allocation module 801, the acceptance test plan module 802, the test script module 803, the defects reporting module 804 and the external processes module 805. The execution of the acceptance test plan occurs in the acceptance testing module 810.

The high level quality assurance resource estimate and the high level quality assurance time estimate for the acceptance testing and the staff allocation module document are developed in the staff allocation module 801. The staff allocation module 801 includes means (not shown) for developing the high level quality assurance resource estimate and the high level quality assurance time estimate and for recording such high level quality assurance resource estimate and high level quality assurance time estimate in the staff allocation document.

The acceptance test plan module 802 receives an output from the staff allocation module 801 and develops an acceptance test plan. The acceptance test plan module 802 includes means (not shown) for developing the acceptance test plan as described above with reference to FIG. 3.

The outputs of the acceptance test plan module 802 are coupled to the acceptance testing module 810 and the test script module 803. The test script module 803 receives the acceptance test plan from acceptance test plan module 802 and generates both the function log document and the test scripts. The test script module 803 includes means (not shown) for creating the function logs document and the test scripts as described above with reference to FIG. 4. The function logs document and the test scripts are transmitted to the acceptance testing module 810 for execution of the acceptance test plan.

The defects reporting module 804 receives inputs from both the external processes module 805 and the acceptance testing module 810. The defects reporting module 804 processes any defects identified during the execution of the acceptance test plan and transmits the identified defects to the developer area. The defects reporting module 804 includes means (not shown) for processing defects as described above with reference to FIG. 5.

The external processes module 805 receives inputs from both the acceptance testing module 810 and the defects reporting module 804. The external processes module 805 has an output connected to the staff allocation module 801. The external processes module 805 includes the development area, an information technology area, or an area for any other processes external to the acceptance testing. The external processes module 805 receives or generates a business analysis outline which it transmits to the staff allocation module 801 and the acceptance testing module 810.

Figure 9:
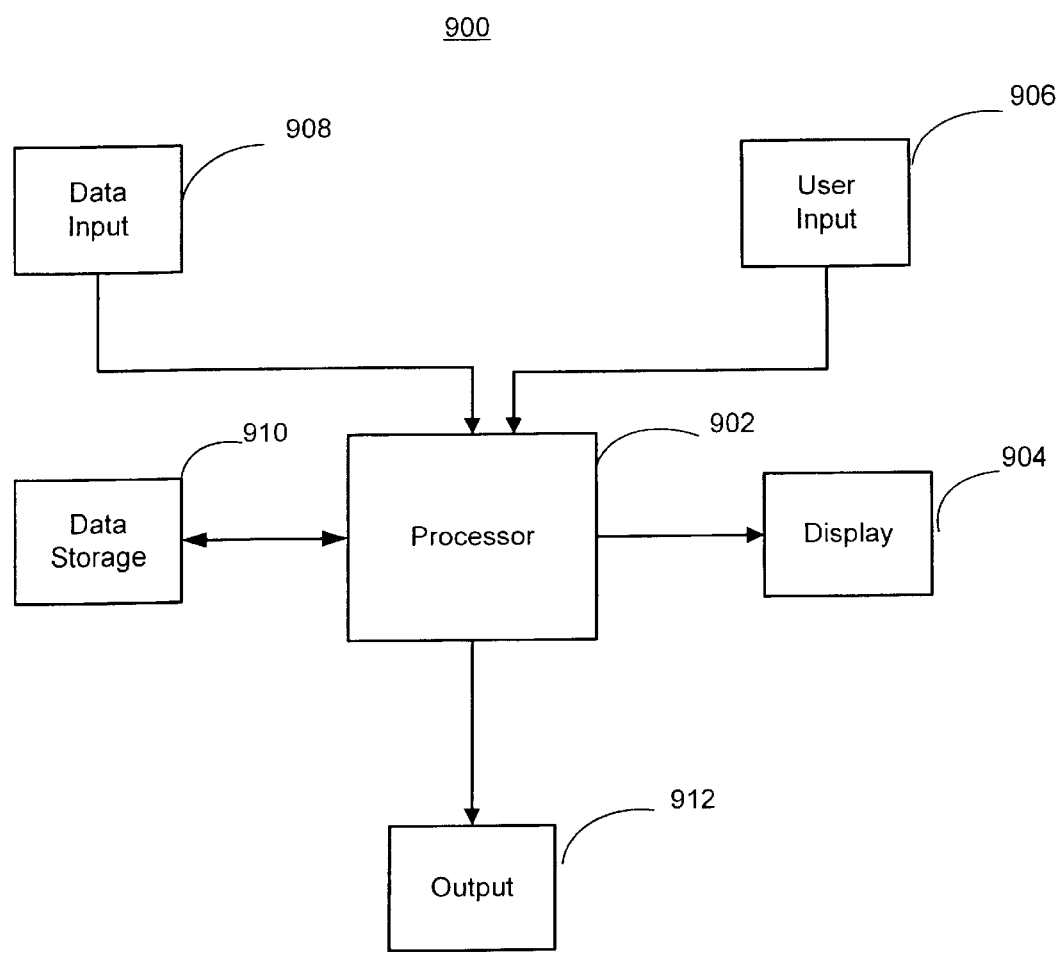
FIG. 9 is a block diagram of one embodiment of a system for data analysis for acceptance testing.

FIG. 9 is a block diagram illustrating the components of one embodiment of a system 900 used for acceptance testing. As shown in FIG. 9, system 900 may be comprised of a processor module 902, a display 904, a user input 906, a data input module 908, a data storage module 910, and an output module 912. Generally, the processor module 902 receives inputs from the data input module 908 and the user input module 906, and provides outputs via the display 904 and the output module 912. The processor module 902 may also receive inputs and provide outputs through the data storage module 910.

According to an embodiment of the invention, the processor module 902 may be a standard processor suitable for performing any necessary calculations required for the acceptance testing, including multiple task processing as necessary. As illustrated, the processor module 902 may receive inputs from the data input module 908 and the user input module 906, as well as data from the data storage module 910. The data input module 908 may be any conventional data input device, such as a magnetic or an optical disk drive, a CD-ROM, a scanner, a modem, an Internet connection, a hard-wired connection, or any other device for inputting data to the processor module 902. The user input module 906 may be any conventional user input device, such as a keyboard, a touch-screen, a roller-ball, a mouse, a pointer, or any other device for a user to enter and direct manipulation of data in the processor module 902.

The data storage module 910 may be comprised of any conventional storage device, such as a computer memory, a magnetic or an optical disc or a CD-ROM, a tape-to-tape reel, or any other device for storing data. In the context of conducting the acceptance testing, the data storage module 902 may contain information related to the business analysis outline, the acceptance test plan, the high level quality assurance time estimate and the high level quality assurance resource estimate, the past quality assurance project, defects and other information. The processor module 902 may be capable of accessing data in the data storage module 910. Thus, according to an embodiment of the invention, the data storage module 910 may be searchable by a field or in a variety of other conventional manners.

As illustrated, the processor module 902 may provide information through the display 904 and the output module 912, as well as provide data to the data storage module 910. The display 904 may be any conventional display device, such as a television, a monitor, or any other display device. The output module 912 may be any conventional output device, such as a printer, a facsimile machine, a magnetic disc drive, a compact disc drive or an optical disc drive, a modem, an Internet connection, a hard-wired connection, or any other device for outputting data to the processor module 902.

While the foregoing description includes many details and specificities, it should be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A process of conducting quality assurance for acceptance testing of software, the process comprising the steps of:
   (a) developing a high level quality assurance resource estimate and a high level quality assurance time estimate;
   (b) producing a business analysis outline for providing an interpretation of a plurality of user requirements;

(c) creating an acceptance test plan using an acceptance test plan template with the business analysis outline wherein the acceptance test plan provides a plurality of steps to be conducted during execution of the acceptance test;

(d) refining the high level quality assurance resource estimate and the high level quality assurance time estimate based on at least the acceptance test plan;

(e) creating a plurality of test cases to be carried out during a test execution phase of the quality assurance process using the acceptance test plan;

(f) executing each of the test cases in an acceptance test to produce a set of test results for each of the test cases;

(g) evaluating each of the sets of the test results against a set of the refined high level quality assurance resource estimate and the refined high level quality assurance time estimate;

(h) reporting one or more defects tracked during the execution of each of the test cases;

(i) correcting the one or more reported defects;

(j) re-testing the corrected one or more defects;

(k) negotiating a sign off of the acceptance test with a client; and (l) creating and storing an application audit package.

2. The process of claim 1 wherein the step of developing the high level quality assurance resource estimate and the high level quality assurance time estimate comprises a sub-step of developing the high level quality assurance resource estimate and the high level quality assurance time estimate based on a similar project estimate.

3. The process of claim 1 wherein the step of developing the high level quality assurance resource estimate and the high level quality assurance time estimate comprises a sub-step of adding resources to a past quality assurance experience to reduce an implementation time.

4. The process of claim 1 wherein the step of developing the high level quality assurance resource estimate and the high level quality assurance time estimate comprises a sub-step of estimating a number of test cases and multiplying the estimated number of test cases by an average time estimated to execute each of the test cases.

5. The process of claim 1 further comprising a step of attending one or more project meetings if the meetings are of specific value to one or more project testing goals.

6. The process of claim 1 wherein the step of refining the high level quality assurance resource estimate and the high level quality assurance time estimate further comprises a step of refining the high level quality assurance resource estimate and the high level quality assurance time estimate based on the business analysis outline.

7. The process of claim 1 wherein the step of refining the high level quality assurance resource estimate and the high level quality assurance time estimate further comprises a step of refining the high level quality assurance resource estimate and the high level quality assurance time estimate based on past quality assurance project data.

8. The process of claim 1 wherein the step of developing the high level quality assurance resource estimate and the high level quality assurance time estimate further comprises a step of producing a staff allocation document and the step of refining the high level quality assurance resource estimate and the high level quality assurance time estimate comprises the sub-step of refining the staff allocation document.

9. The process of claim 1 wherein the quality assurance process is an acceptance test process.

10. The process of claim 1 wherein the quality assurance process is a software development acceptance test process.

11. The process of claim 1 wherein the step of creating the test cases comprises a sub-step of creating a plurality of test scripts and the step of executing the test cases comprises a sub-step of executing each of the test scripts.

12. A system for conducting a quality assurance process for acceptance testing of software comprising:

(a) means for developing a high level quality assurance resource estimate and a high level quality assurance time estimate;

(b) means for producing a business analysis outline for providing an interpretation of a plurality of user requirements;

(c) means for creating an acceptance test plan using an acceptance test plan template with the business analysis outline wherein the acceptance test plan provides a plurality of steps to be conducted during execution of the acceptance test;

(d) means for refining the high level quality assurance resource estimate and the high level quality assurance time estimate based on at least the acceptance test plan;

(e) means for creating a plurality of test cases to be carried out during a test execution phase of the quality assurance process using the acceptance test plan;

(f) means for executing each of the test cases in an acceptance test to produce a set of test results for each of the test cases;

(g) means for evaluating each of the sets of test results against the refined high level quality assurance resource estimate and the refined high level quality assurance time estimate;

(h) means for reporting one or more defects tracked during the execution of each of the test cases;

(i) means for correcting the one or more reported defects;

(j) means for re-testing the corrected one or more defects;

(k) means for negotiating a sign off of the acceptance test with a client; and (l) means for creating and storing an application audit package.

13. The system of claim 12 wherein each of the high level quality assurance resource estimate and the high level quality assurance time estimate is based on a similar project estimate.

14. The system of claim 12 wherein each of the high level quality assurance resource estimate and the high level quality assurance time estimate is based on adding resources to a past quality assurance experience to reduce an implementation time.

15. The system of claim 12 wherein each of the high level quality assurance resource estimate and the high level quality assurance time estimate is based on estimating a number of test cases and multiplying the estimated number of test cases by an average time estimated to execute each of the test cases.

16. The system of claim 12 further comprising means for attending one or more project meetings if the one or more project meetings are of specific value to one or more project testing goals.

17. The system of claim 12 wherein the means for refining the high level quality assurance resource estimate and the high level quality assurance time estimate further comprises means for refining the high level quality assurance resource estimate and the high level quality assurance time estimate based on the business analysis outline.

18. The system of claim 12 wherein the means for refining the high level quality assurance resource estimate and the high level quality assurance time estimate further comprises means for refining the high level quality assurance resource estimate and the high level quality assurance time estimate based on past quality assurance project data.

19. The system of claim 12 wherein the means for developing the high level quality assurance resource estimate and the high level quality assurance time estimate further comprises means for producing a staff allocation document and wherein the means for refining the high level quality assurance resource estimate and the high level quality assurance time estimate includes means for refining the staff allocation document.

20. The system of claim 12 wherein the quality assurance process is an acceptance test process.

21. The system of claim 12 wherein the quality assurance process is a software development acceptance test process.

22. The system of claim 12 wherein the means for creating the test cases includes means for creating a plurality of test scripts and wherein the means for executing each of the test cases includes means for executing each of the test scripts.

23. A process of conducting a staff allocation in a quality assurance process comprising the steps of:
   developing a high level quality assurance resource estimate and a high level quality assurance time estimate using a business analysis document;
   recording the high level quality assurance resource estimate and the high level quality assurance time estimate in a staff allocation module document;
   confirming the high level quality assurance resource estimate and the high level quality assurance time estimate by reviewing the business analysis document, creating one or more statements, and verifying the one or more statements; and
   refining the high level quality assurance resource estimate and the high level quality assurance time estimate by listing a project by one or more functions, creating a plurality of statements, verifying the statements, confirming the high level quality assurance resource estimate and the high level quality assurance time estimate, and identifying a plurality of acceptance test characteristics.

24. The process of claim 23 wherein the high level quality assurance resource estimate and the high level quality assurance time estimate is based on a similar project estimate.

25. The process of claim 23 wherein the high level quality assurance resource estimate and the high level quality assurance time estimate is based on adding resources to a past quality assurance experience to reduce an implementation time.

26. The process of claim 23 wherein the high level quality assurance resource estimate and the high level quality assurance time estimate is based on estimating a number of test cases and multiplying the estimated number of test cases by an average time estimated to execute each of the test cases.

27. The process of claim 23 wherein the step of developing the high level quality assurance resource estimate and the high level quality assurance time estimate further comprises a sub-step of using a past quality assurance project acceptance test plan and data.

28. The process of claim 23 wherein the quality assurance process is a software development process.

29. A process of conducting a staff allocation in a quality assurance process comprising the steps of:
   developing a high level quality assurance resource estimate and a high level quality assurance time estimate using a business analysis document;
   recording the high level quality assurance resource estimate and the high level quality assurance time estimate in a staff allocation module document; and
   refining the high level quality assurance resource estimate and the high level quality assurance time estimate by listing a project by one or more functions, creating a plurality of statements, verifying the statements, confirming the high level quality assurance resource estimate and the high level quality assurance time estimate, and identifying a plurality of acceptance test characteristics;
   wherein the acceptance test characteristics include a number of functions, a number of test cases, a number of remaining test cases, a number of defects, a number of open defects, a responsible party and a status.

30. A system for conducting a staff allocation in a quality assurance process comprising:
   means for developing a high level quality assurance resource estimate and a high level quality assurance time estimate using a business analysis document;
   means for recording the high level quality assurance resource estimate and the high level quality assurance time estimate in a staff allocation module document;
   means for confirming the high level quality assurance resource estimate and the high level quality assurance time estimate by reviewing the business analysis document, creating one or more statements, and verifying the one or more statements; and
   means for refining the high level quality assurance resource estimate and the high level quality assurance time estimate by listing a project by one or more functions, creating a plurality of statements, verifying the statements, confirming the high level quality assurance resource estimate and the high level quality assurance time estimate, and identifying a plurality of acceptance test characteristics.

31. The system of claim 30 wherein the means for developing the high level quality assurance resource estimate and the high level quality assurance time estimate comprises means for developing the high level quality assurance resource estimate and the high level quality assurance time estimate based on a similar project estimate.

32. The system of claim 30 wherein the means for developing the high level quality assurance resource estimate and the high level quality assurance time estimate comprises means for adding resources to a past quality assurance experience to reduce an implementation time.

33. The system of claim 30 wherein the means for developing the high level quality assurance resource estimate and the high level quality assurance time estimate comprises means for estimating a number of test cases and means for multiplying the estimated number of test cases by an average time estimated to execute each of the test cases.

34. The system of claim 30 wherein the means for developing the high level quality assurance resource estimate and the high level quality assurance time estimate further comprises means for using a past quality assurance project acceptance test plan and data.

35. The system of claim 30 wherein the quality assurance process is a software development process.

36. A system for conducting a staff allocation in a quality assurance process comprising:
   means for developing a high level quality assurance resource estimate and a high level quality assurance time estimate using a business analysis document;
   means for recording the high level quality assurance resource estimate and the high level quality assurance time estimate in a staff allocation module document; and
   means for refining the high level quality assurance resource estimate and the high level quality assurance time estimate by listing a project by one or more functions, creating a plurality of statements, verifying the statements, confirming the high level quality assurance resource estimate and the high level quality assurance time estimate, and identifying a plurality of acceptance test characteristics wherein the acceptance test characteristics include a number of functions, a number of test cases, a number of remaining test cases, a number of defects, a number of open defects, a responsible party and a status.

* * * * *